KEY GENERATORS FOR CRYPTOGRAPHIC SYSTEMS
Filed Jan. 23, 1963
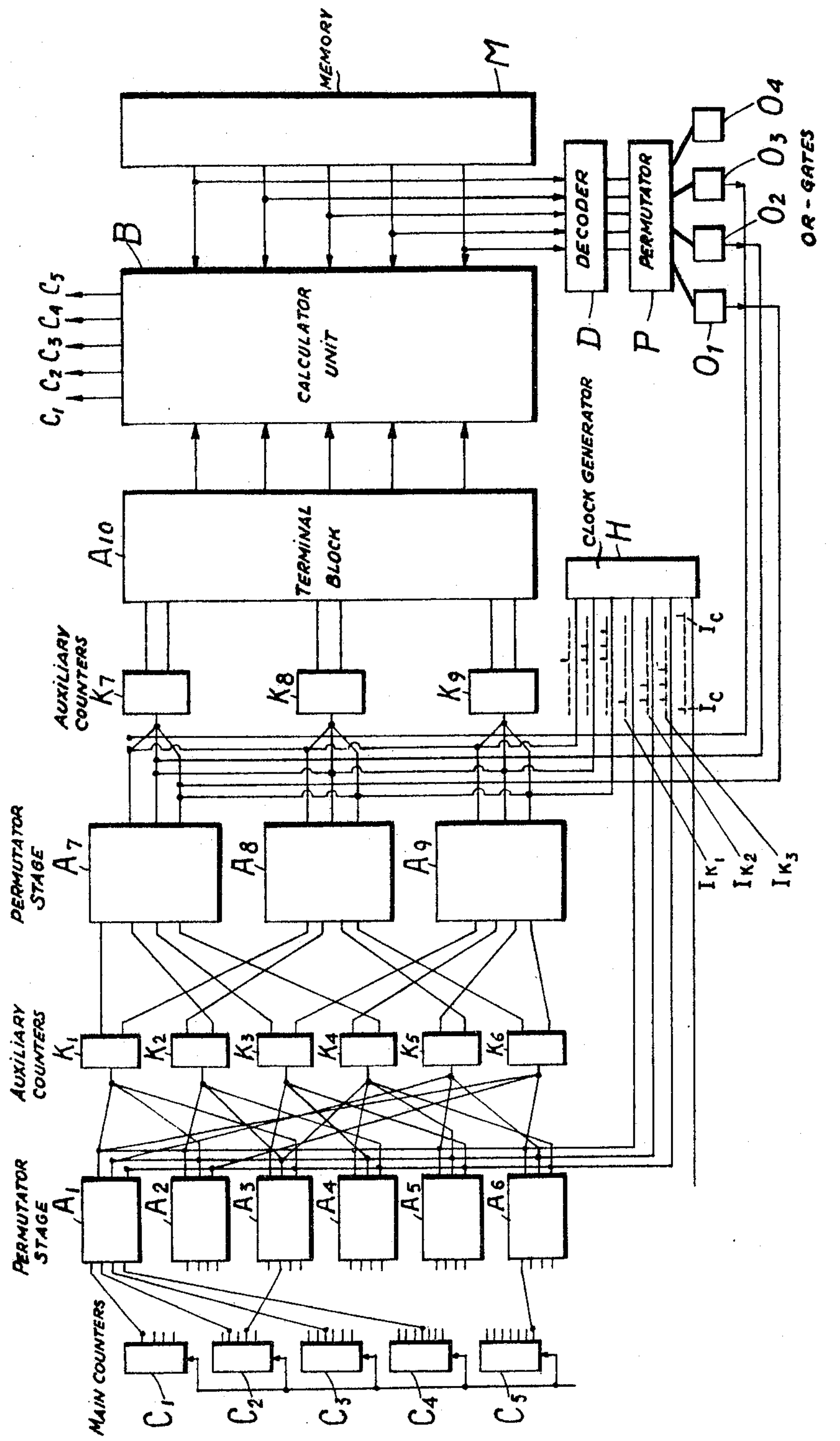

United States Patent Office 3,364,308

Patented Jan. 16, 1968

3,364,308

KEY GENERATORS FOR CRYPTOGRAPHIC SYSTEMS

Jean-Pierre Vasseur, Paris, France, assignor to CSF.—Compagnie Générale de Télégraphie Sans Fil, a corporation of France Filed Jan. 23, 1963, Ser. No. 253,397
3 Claims. (Cl. 178—22)

The present invention relates to cryptographic systems and more particularly to electrical generators of quasi random digits or symbols which may be used as key generators for cryptographic systems, as described in the copending patent application Ser. No. 127,171 for "Improvements in Electrical Generators of Quasi-Random Symbols," filed July 27, 1961, now U.S. Patent 3,170,033.

The invention is more particularly related to such generators of the type comprising, in addition to the main advance counters, auxiliary advance counters.

The function of the auxiliary counters is to render substantially equiprobable the outputs of the key generator.

It is an object of this invention to cause one or more of said auxiliary counters to advance as a function of the preceding letter in clear, thus rendering "self-keying" the cryptographic system incorporating such a key generator.

The invention will be best understood from the following description and appended drawing, the single figure of which is an embodiment of a cryptographic system according to the invention.

The system shown in the figure comprises a plurality of "main advance" binary counters $C_1$ to $C_5$. The outputs of counters $C_1$ to $C_5$ are respectively coupled to permutator stages $A_1$ to $A_6$, respectively comprising decoders, having their outputs coupled to permutators, which in turn have their outputs coupled by groups of OR-circuits. The outputs of the OR-circuits are coupled to AND-circuits, as described in the copending patent application, Ser. No. 197,099, filed May 23, 1962, for "Electrical Generators in Quasi-Random Digits," now U.S. Patent 3,250,855. The AND-gates are coupled to auxiliary counters $K_1$ to $K_6$.

Counters $K_1$ to $K_6$ have their outputs coupled, as shown in the drawing, to stages $A_7$ to $A_9$, similar to stages $A_1$ to $A_6$. Stages $A_7$ to $A_9$ have their outputs coupled to further auxiliary counters $K_7$ to $K_9$. The latter feed a block $A_{10}$ which will be briefly described hereinafter, and which provides, in the non-limitative example given, five key digits to the calculator unit B.

It should be noted that an embodiment of block $A_{10}$ has been described in the above mentioned copending patent application, Ser. No. 197,099 for "Improvements in Electrical Generators of Quasi-Random Digits," filed by the applicant May 23, 1962, and an embodiment of calculator unit B has been described in the copending patent application Ser. No. 817,565 for "Improvements in Ciphering Devices," filed June 2, 1959, and now abandoned.

A storage device M delivers to calculator unit B letters in clear in the shape of five binary digits. A decoder D receives the same five binary digits and feeds them to a permutator P which in turn feeds four OR-circuits $O_1$ to $O_4$, each OR-circuit having thus four inputs, which are only diagrammatically shown in the figure. The assembly also comprises a clock H, connected as shown and as described in the above mentioned copending patent application, Ser. No. 197,099.

The operation of this system is generally similar to that of the system described in the above mentioned copending patent application, Ser. No. 127,171.

It will be briefly recalled that the main counters $C_1$ to $C_5$ advance under the action of a first set of recurrent pulses $I_c$, provided by clock H. The binary digits thus generated by the counters are distributed in six groups, or any other number of groups, which groups are respectively decoded and permutated in stages $A_1$ to $A_6$.

As described in the above mentioned patent application, Ser. No. 127,171, the OR-circuits included into stages $A_1$ to $A_6$ reduce the number of outputs of stages $A_1$ to $A_6$, each of which comprises three outputs and four inputs in the example illustrated, thus increasing the cryptographic security.

Each counter $K_1$ to $K_6$ has only one input, to which are applied one, two or three advance pulses, according to the output of stages $A_1$ to $A_6$ which is energized.

As also described in the copending patent application 127,171, pulses provided by clock H are used for applying the output of stages $A_1$ to $A_6$ to counters $K_1$ to $K_6$ so that a given counter will advance only upon simultaneous application of a signal from blocks $A_1$ to $A_6$ and of a pulse from clock H.

Under these conditions, and as shown in the copending patent application, Ser. No. 127,171, the probability of a signal appearing is the same at all the outputs of the auxiliary counter $K_1$ to $K_6$.

Stages $A_7$ to $A_9$ and auxiliary counters $K_7$ to $K_9$ operate in a similar way, and it may be shown that equiprobability of the appearance of the output pairs of these latter counters, and, ultimately, the equiprobability of the appearance of pairs of two successive letters is thus achieved at the output of the key.

By using $n$ stages of auxiliary counters $K_1$, it would be possible to ensure the equiprobability of the appearance of groups of $n$ successive letters at the output of the key.

The assembly $A_{10}$ may comprise decoders, permutators, encoders, OR-circuits, etc., . . . which may be combined in various ways, as described in the above mentioned copending patent application Ser. No. 197,099.

As already mentioned an embodiment of the calculator unit B has been described in the copending patent application, Ser. No. 817,565. Other embodiments are within the scope of those skilled in the art. Calculator unit B provides at its outputs $C_1$ to $C_5$ enciphered letters starting from letters in clear, applied thereto for example by means of a storage device M, and from key symbols from device $A_{10}$.

The circuit so far described is known from the above mentioned copending patent applications. It has been recalled only for providing a clearer understanding of the present invention.

The essential feature of the invention lies in the fact that the advance of one or several auxiliary counters is made a function of the preceding letter in clear.

In the example described, the invention is applied only to counter $K_7$. The three OR-circuits $O_1$, $O_2$ and $O_3$ are respectively connected to the outputs of the three OR-circuits which outputs are respectively connected to the inputs of the already mentioned AND-circuits. The three other inputs of these OR-circuits are respectively connected to the three outputs of stage $A_7$.

In normal operation, counter $K_7$ advances as a function of the coincidence between the signals from clock H and the output signals of stage $A_7$ at the inputs of the AND-circuits. At the end of the cycle, OR-circuits $O_1$, $O_2$ or $O_3$ transmit a pulse, resulting in an additional advance of counter $K_7$, through coincidence between this pulse and one of the groups of clock pulses.

Under such conditions the enciphering system may be said to be "self keying," since each ciphering alphabet provided by the key depends on one or several preceding letters in clear, which may be, under certain conditions, a desirable feature.

It will be apparent that this self "key-keying" character of the system is achieved, according to the invention, in an extremely simple manner.

Upon reception of the ciphered signal, before deciphering a letter, the initial phase of one or several of the auxiliary counters will have to be modified by the preceding letter in clear as deciphered.

If, during the transmission, an error has occurred this deciphered letter is no longer the correct one. At the beginning of the deciphering of the next letter, the initial state of the auxiliary counters, which had undergone additional advances, is then generally also no longer correct, and accordingly the same is also true for the keying alphabet produced by the key. The following deciphered letter is therefore also erroneous, the error thus produced continuing to result in a false deciphering during a certain interval of time.

During this period of erroneous deciphering, the deciphered letters and the additional advances given to the auxiliary counters at the end of each deciphering cycle being of a substantially random nature, it will ultimately happen that, at the beginning of the deciphering of a letter, the auxiliary counters will assume the correct position, i.e. the position they would have had if the transmission error had not occurred. From this moment, the deciphering becomes correct again and the perturbation due to the transmission error vanishes.

It may be shown that any increase in the cryptographic efficiency of the system described is finally associated with a proportional increase in sensitivity to errors. A suitable compromise between the two requirements will be made in each case.

In practice the letters in clear will be distributed into four groups, substantially equiprobable, producing, respectively, additional advances of 0, 1, 2 or 3 steps over one of the auxiliary counters.

From the cryptographic point of view, it is not the same to act on counters $K_1$ to $K_6$ of the first stage or on counters $K_7$ to $K_9$, since the latter advance under the action of the former. The action on counters $K_1$ to $K_6$ results in a greater perturbation of the encoding alphabet, but also in a greater sensitivity to errors.

It would be possible, in principle, to act on the main advance counters, but the duration of an error would be much two great.

If it is desired to act on two counters K, it is possible to distribute the letters in clear into four substantially equi-probable groups in two manners, each defining an advance law of 0, 1, 2 or 3 steps of the counter considered and this method may then be generalized to the case where any number of counters K are acted upon.

It is finally possible, at the cost of some complication, to store the two last letters in clear and use these pairs to define additional advances of one or several counters.

What is claimed is:

1. A key generator for self-keying cryptographic system comprising: a plurality of main counters having first outputs; at least one permutator stage having inputs coupled to said first outputs, and second outputs; a plurality of AND-gates having inputs coupled to said second outputs and third outputs; a plurality of auxiliary binary counters having inputs coupled to said third outputs; and means for feeding signals derived from letters in clear to said AND-gate inputs.

2. A key generator for self-keying cryptographic systems comprising: a plurality of main counters having first outputs; at least one permutator stage, having inputs coupled to said first outputs and second outputs; a plurality of AND-gates having inputs coupled to said second outputs and third outputs; a plurality of auxiliary binary counters having inputs coupled to said third outputs; and a plurality of OR-gates having inputs for receiving letters in clear and fourth outputs, said fourth outputs being connected to said AND-gate inputs.

3. A key generator for self-keying cryptographic systems comprising: a plurality of main counters having first outputs; at least one permutator stage, having inputs coupled to said first outputs and second outputs; a plurality of AND-gates having inputs coupled to said outputs and third outputs; a plurality of auxiliary binary counters having inputs coupled to said third outputs; decoder and permutator circuits having inputs for receiving letters in clear and fifth outputs; and a plurality of OR-gates having inputs connected to said fifth outputs and fourth outputs, said fourth outputs being connected to said AND-gate inputs.

References Cited

UNITED STATES PATENTS 3,051,783 8/1962 Hell et al. ---------- 178—22

THOMAS B. HABECKER, *Primary Examiner.*

NEIL C. READ, ROBERT H. ROSE, *Examiners.*

A. J. DUNN, *Assistant Examiner.*